United States Patent [19]

Chamberlain

[11] 4,443,907
[45] Apr. 24, 1984

[54] COMBINATION WINDSHIELD WIPER CLIPS

[75] Inventor: Howard W. Chamberlain, Dundas, Canada

[73] Assignee: Tridon Limited, Hamilton, Canada

[21] Appl. No.: 435,857

[22] Filed: Oct. 21, 1982

[51] Int. Cl.³ ............................................. B60S 1/40
[52] U.S. Cl. .................................................. 15/250.32
[58] Field of Search .......................... 15/250.32–250.42

[56] References Cited

U.S. PATENT DOCUMENTS 3,942,212  1/1976  Steger et al. ..................... 15/250.22
4,290,164  9/1981  Van Den Berg ................. 15/250.32

FOREIGN PATENT DOCUMENTS 2487757  2/1982  France ............................... 15/250.32
2055560  3/1981  United Kingdom ............. 15/250.32

Primary Examiner—Peter Feldman
Attorney, Agent, or Firm—Hirons, Rogers & Scott

[57] ABSTRACT

A windshield wiper clip for the selective detachable attachment of a windshield wiper assembly to at least two wiper arms of the hooked end type having arm ends of different transverse widths. The clip body is shaped to fit within the hooked end of a first wiper arm of wider width having a respective first angular orientation and said clip body has a groove for the reception therein of a hooked end of a second wiper arm of narrower width being disposed in a respective angular orientation different from the first angular orientation.

8 Claims, 7 Drawing Figures

COMBINATION WINDSHIELD WIPER CLIPS

FIELD OF THE INVENTION

This invention relates to improvements in windshield wiper clips employed for connecting a windshield wiper assembly to a motor-operated arm by which the wiper assembly is moved across a windshield.

REVIEW OF THE PRIOR ART

One of the most complex problems in the marketing of windshield wiper assemblies intended to replace the assemblies originally supplied with a vehicle results from the fact that the vehicle manufacturers' usually prefer to employ their own proprietary design of wiper arm and wiper assembly, and particularly their own specific form of connector between the wiper assembly and the wiper arm end connected thereto. A principal purpose is of course to help secure the profitable aftermarket for replacement parts. The manufacturer of a replacement assembly will wish to use it with as many different wiper arms as possible, and to this end supplies with each assembly one or more clips that will permit it to be connected to the designated wiper arms. The number of clips that needs to be supplied with each assembly is reduced as much as possible by making each clip usable with as many different wiper arms as possible, and there have been therefore a large number of prior proposals for such so-called "combination" clips.

In practice it appears to be somewhat simpler to accommodate two quite different wiper arm end configurations with a single combination clip, than two similar configurations of different sizes, because of interference between the two similar structures. This is particularly true of the popular hooked arm end which is employed in at least two different widths, usually 7 mm and 9 mm. The principal problem arises because the hooked portions of the arm ends are of the same curvature, and if the clip is arranged for adequate transverse support of the wider arm, then it becomes difficult to provide enough transverse support for the narrower arm, and vice versa, especially at the location of the 180 degree curve that forms the hook.

SUMMARY OF THE INVENTION

The principal object of the invention is therefore to provide a new combination wiper clip of simple and inexpensive form and for use with two different wiper arms both having a wiper superstructure engaging end of hooked configuration, but of different widths.

It is another object to provide such clip especially adapted for manufacture as a plastic moulding.

In accordance with the present invention therefore there is provided a new combination windshield wiper clip for the selective detachable attachment of a windshield wiper assembly to at least two wiper arms of the hooked end type having arm ends of different transverse widths, the clip comprising:

a clip body including attachment means for releasable pivoting attachment of the clip within a slot in the superstructure member of a wiper assembly, the clip body being shaped to fit within the hooked end of a first wiper arm of a wider width and to be closed embraced thereby with the arm in a respective first angular orientation in a longitudinal plane, the clip body having therein a groove for the reception therein of the hooked end of a second wiper arm of narrower width disposed in said longitudinal plane in a respective second angular orientation different from said first orientation for transverse retention of the narrower hooked wiper arm end in the groove, and retaining means for the releasable retention of either a wider or a narrower wiper arm hooked end closely embracing the clip body within the arm hooked end.

Also in accordance with the invention there is provided a new combination windshield wiper clip for the selective detachable attachment of a windshield wiper assembly to at least two wiper arms of the hooked end type having arm ends of different transverse widths, the clip comprising:

a clip body including attachment means for releasable pivoting attachment of the clip to the superstructure of a wiper assembly, the clip body having separate first and second grooves therein for the reception of respective first and second hooked wiper arm ends of said different widths closely embracing the clip body, the said first and second grooves overlying one another in the clip body and having different angular orientations therein in the same longitudinal plane to provide respective groove side walls for transverse retention of each hooked wiper arm end in its respective groove, and retaining means for the releasable retention of either a wider or a narrower wiper arm hooked end closely embracing the clip body within the arm hooked end.

DESCRIPTION OF THE DRAWINGS

Combination windshield wiper clips which are particular preferred embodiments of the invention will now be described, by way of example, with reference to the accompanying diagrammatic drawings, wherein.

Similar parts are given the same reference number in all the figures of the drawings.

DESCRIPTION OF THE PREFERRED EMBODIMENT

Figure 1:
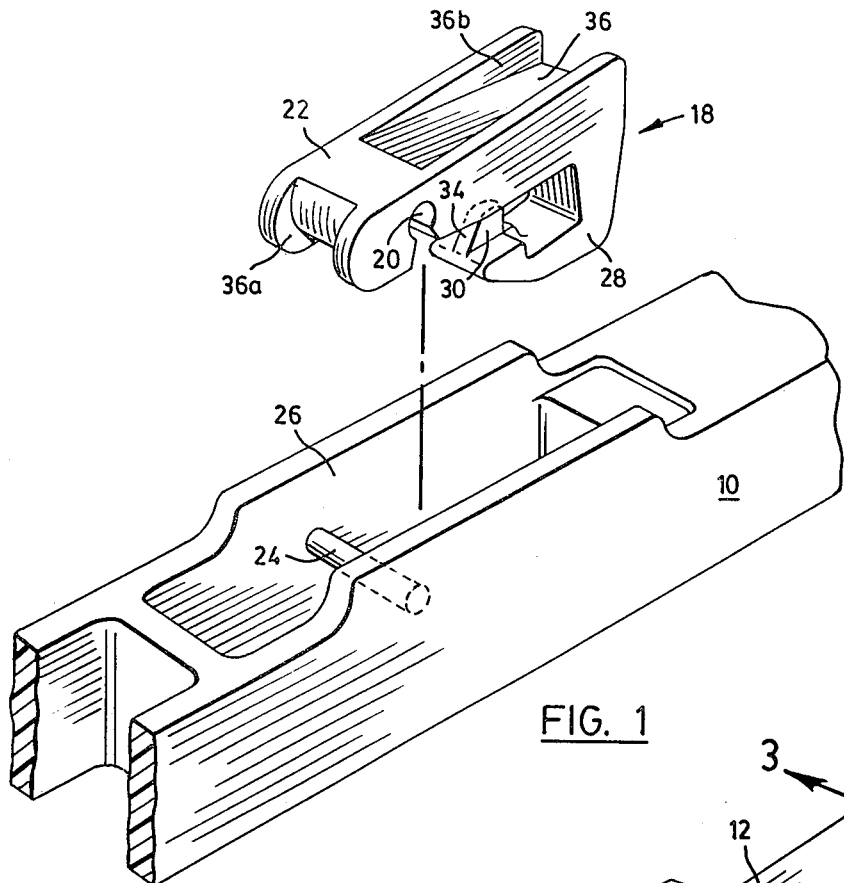
FIG. 1 is a perspective view of a first embodiment and showing also the central portion of a windshield wiper superstructure in which the clip is to be mounted.
Figure 2:
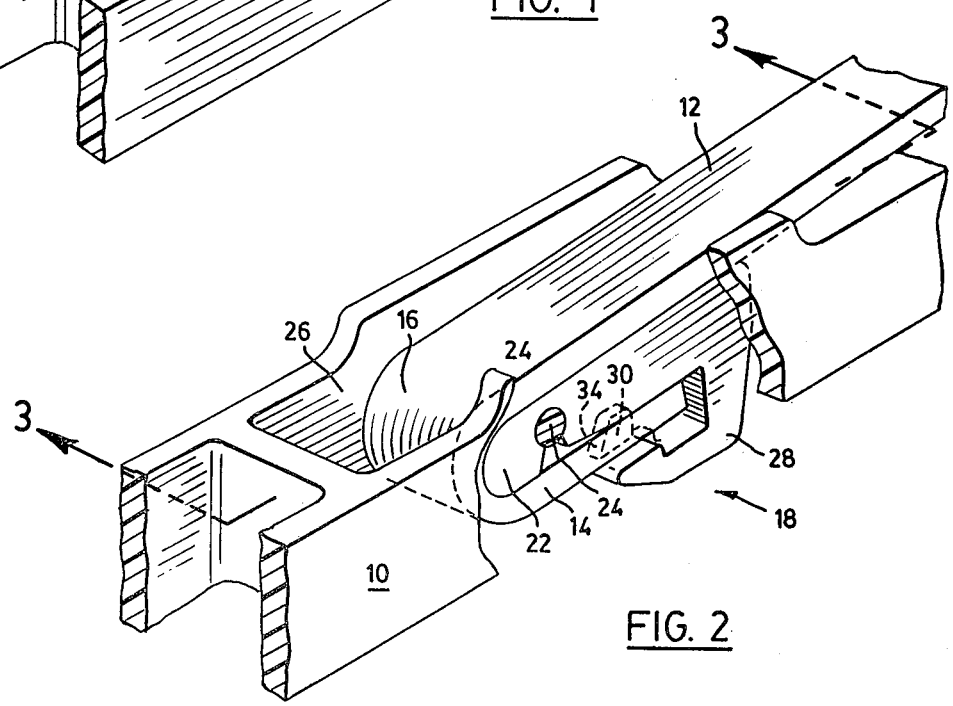
FIG. 2 is a similar view of the embodiment of FIG. 1 showing mounted thereon a wide hooked end wiper arm, part of the superstructure being broken away for clarity of illustration.

The combination windshield wiper clips particularly illustrated and described herein as embodiments of the invention are intended to permit the attachment of a windshield wiper superstructure 10 alternatively to hooked end windshield wiper arms of two different widths. In addition the arm hooked end can be of the straight or reverse hook type, so that each clip is usable with four different arm ends. In operation each wiper arm 12 will have one end connected to a suitable drive motor (not shown), while the other end 14 which is connected to the windshield wiper superstructure is turned back through 180 degrees to form a rounded end portion 16 and to extend parallel to the adjacent part of the arm.

The particular structure of the windshield wiper assembly is not pertinent to this invention and only a central portion is shown where the arm 12 is attached by a clip 18 of the invention. For proper functioning of the wiper it is usually essential that the superstructure be able to pivot on the end of the wiper arm about an axis parallel to the surface to be wiped by the wiper, and the attaching means by which the clip is attached to the superstructure should conveniently permit such pivoting motion. In these particular embodiments the attaching means are illustrated as comprising a keyhole-shaped slot 20 in the body 22 of the clip, which slot permits the body to be securely snap-fitted onto a transverse pivot pin 24 disposed in a longitudinally extending slot 26 in the superstructure 10. This slot is symmetric about a central longitudinal plane and the pivotal axis of the pin 24 is perpendicular to this plane. Reference will be made to this plane as required for simplification of the description of the invention. Such an attachment means permits the clip to be readily attached and detached as required without the use of special tools, and also provides the required pivoting motion in the longitudinal plane between the pin 24 and the clip 18, but other forms of attachment means can also be employed, as will be apparent to those skilled in the art.

In this first embodiment the transverse width of the clip is made the same as that of the wider of the two arms with which it is to be used, and the width of the slot 26 is just sufficient for the hooked arm end and the clip to move freely therein as the arm pivots about the pin 24, but without excessive side play. The body 22 of the clip is elongated in the longitudinal plane and is of a shape and size to fit snugly within the space formed between the rounded base portion 16 and the adjacent spaced parallel portions of the arm. The main clip body 22 extends beyond the free end of the arm portion 14 and is provided with a U-shaped extension 28 that overlies the said free end, one end of the extension being integral with the body 22 while the other end carries a locking tab 30 that extends toward the body so as to engage the arm end portion 14. The locking tab 30 cooperates with a slot 32 in the arm end portion 14 to constitute retaining means for retaining the arm on the clip. Thus the arm is mounted on the clip by hooking it over the rounded end of the clip body and moving it longitudinally thereon, the parallel arm portions sliding freely over the corresponding parallel surfaces of the clip body, until the leading free end of arm portion 14 engages a sloping cam face 34 of the locking tab 30. Further mounting movement of the arm displaces the tab away from the clip body against the resilience of the moulded plastics material of the body, until the tab enters the slot 32 and will then prevent withdrawal of the arm from the clip, until the tab is suitably displaced by some outside agency out of the slot.

The arm is now held positively by the retaining means tab against longitudinal dismounting movement relative to the clip body, and is held against transverse movement by its engagement with the side walls of the slot 26, but can readily be released from the clip when required.

Figure 4:
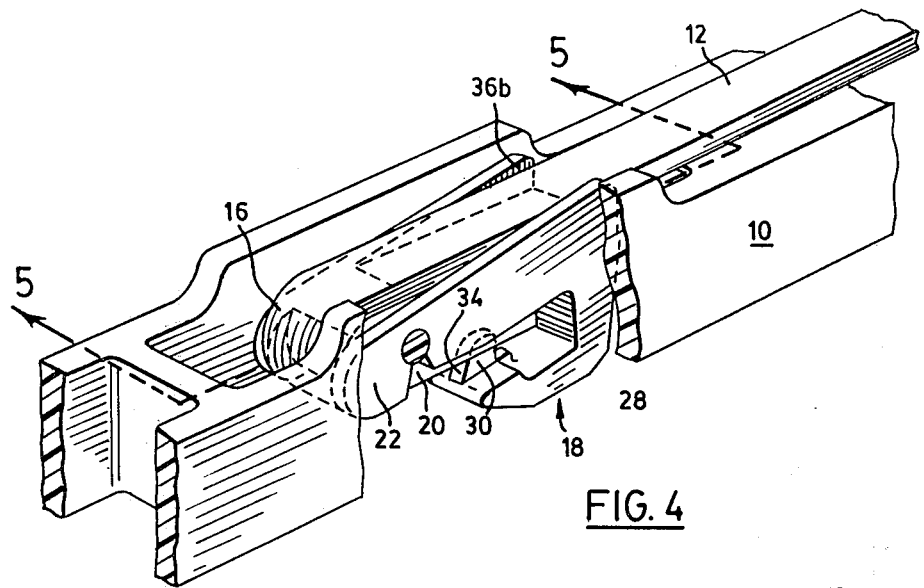
FIG. 4 is a view similar to FIG. 2 and showing the clip having mounted thereon a narrower hooked end wiper arm.
Figure 3:
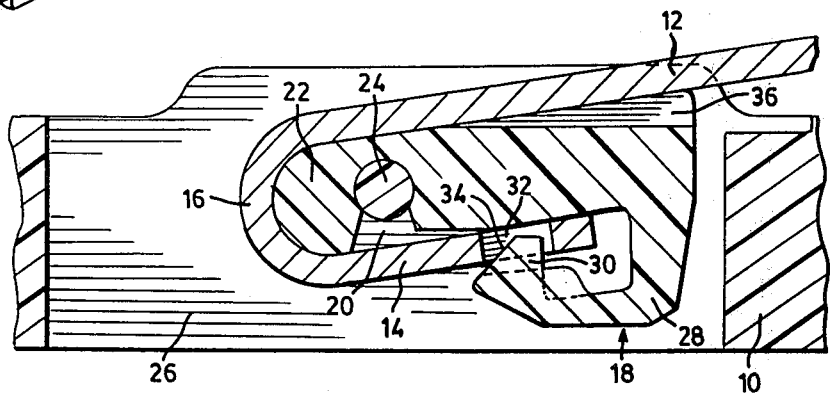
FIG. 3 is a section taken on the line 3—3 of FIG. 2.
Figure 5:
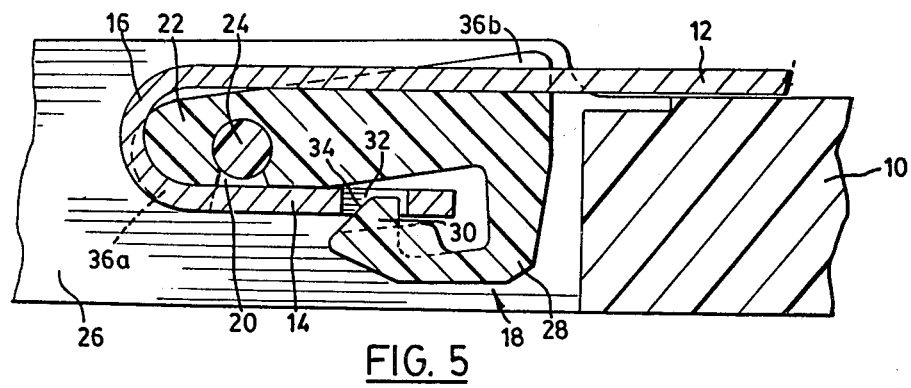
FIG. 5 is a section taken on the line 5—5 of FIG. 4.

The narrower hook end arm 12 illustrated in FIGS. 4 and 5 is, except for its narrower width, of substantially the same dimensions and configuration as the wider arm. In particular the curved ends of the two arms are usually of about the same curvature and the arm ends 14 are of about the same length. The narrower arm will therefore also closely embrace the curved end of the clip, but there is a completely unacceptable substantial clearance on either side between its side walls and the respective facing side walls of the slot 26. In accordance with this invention the main body of the clip is provided with an elongated retention groove 36 of the required narrower width to just receive the narrower arm without substantial side play. It is possible to provide such a narrower groove by forming it with a different respective angular orientation in the longitudinal plane from the corresponding effective angular orientation in the same plane of with wider groove that is formed, in effect, by the cooperation of the clip body with the walls of the slot 26. Thus, it will be seen that by appropriate selection of the size of the angular difference in the longitudinal plane between the two overlying groove orientations the narrower groove 36 can be made to have side walls 36a of substantial extent at the curved end of the clip, and also side walls 36b of substantial extent at the other end of the clip, where it engages the main part of the arm 12 and can exercise the greatest restraining leverage thereon, so that the arm is held sufficiently firmly against transverse movement, while permitting the retaining slot 32 therein to cooperate with the same retaining tab 34 that is employed with the wider arm.

This offsetting in the same plane of the angular orientations of the two arm locations on the clip with use of a common retaining tab location permits the hook centres for the two hooks to remain approximately constant, so that the overall geometry of the wiper is not changed appreciably. In a specific embodiment for use with hook end wiper arms of 7 mm and 9 mm width the clip is about 18 mm long, and the angle between the two overlying groove orientations is about 9 degrees. In such an embodiment an orientation between 7 and 25 degrees would be satisfactory. These small differences in angular orientation are readily accommodated by the pivoting attachment between the clip and the wiper superstructure.

It will be seen that the narrower groove 36 can also be provided offset to one side of the clip body and the longitudinal plane, so that the narrower arm is restrained transversely on one side by the groove side walls 36a and 36b, and on the other side by the facing side walls of the slot 26. Such a construction is not specifically illustrated and is not as satisfactory or as aesthetically pleasing as the symmetric arrangement illustrated; it may be appropriate however if the difference between the two arm widths is so small that only a single groove side wall of adequate thickness can be provided in a suitable plastics material.

Figure 6:
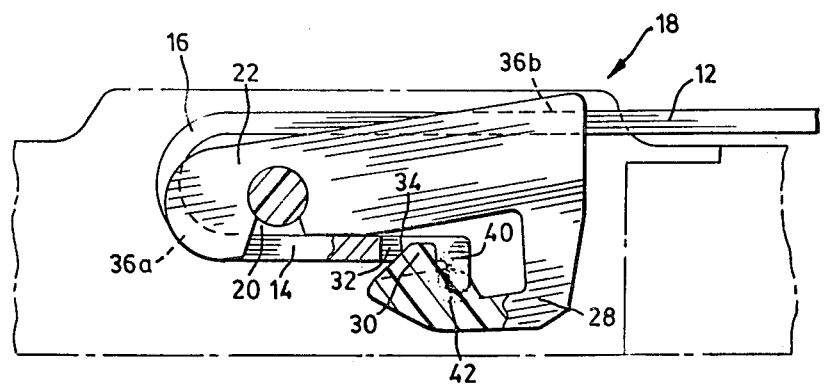
FIG. 6 is a side elevation illustrating the mounting on the clip of a narrow wiper arm of reverse hook end type.

The manner of operation of the clip of the invention with a hook end wiper arm of reverse hook attachment type is essentially similar to that with a straight hook arm, as will be seen from FIG. 6. The part of the clip extension 28 that carries the retaining tab 30 is shaped to be a close fit within the reverse hook portion 40 of the arm end 14 and is provided with a central protruding wall 42 that receives the central groove of this type of wiper arm end, so that the reverse hook can snap over the tab 30 for releasable retention of the arm on the clip.

Figure 7:
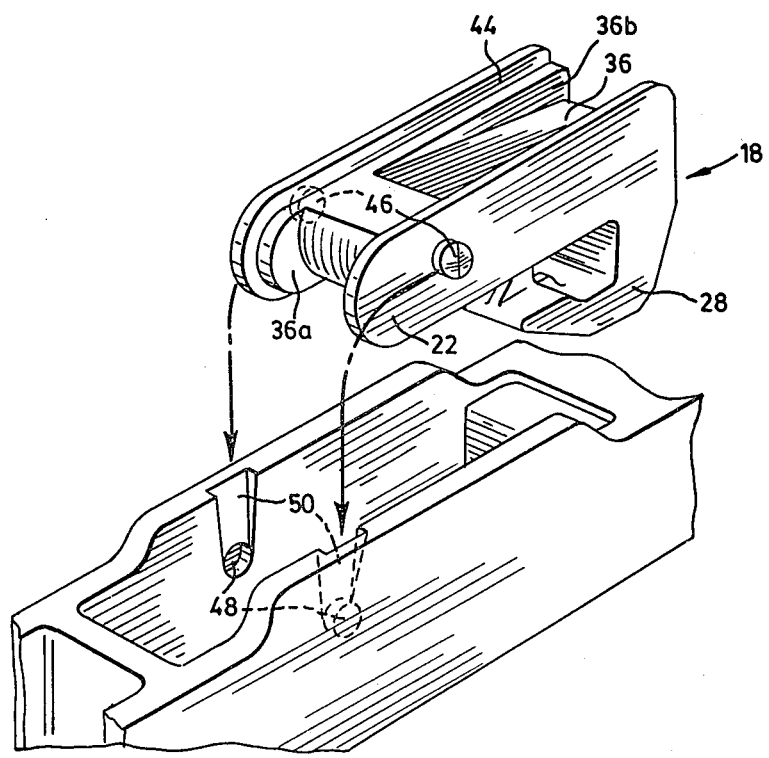
FIG. 7 is a perspective view of a second embodiment of the invention.

FIG. 7 illustrates the application of the invention to a form of clip in which the clip body is provided with a wider groove 44 of a first orientation in the longitudinal plane, which is overlaid by the narrower groove 36 of the second orientation, both grooves again being associated with a common retaining means. Such structure is employed for example when the slot 26 in the superstructure is too wide to serve as the wider "groove" receiving and retaining the wider arm against transverse movement. Such a clip body may be provided for example with a sideways-extending pin by which it is connected to the windshield wiper superstructure, but in the embodiment illustrated is provided with two coaxial projecting pins 46 that are engaged in respective recesses 48 the superstructure, ramps 50 being provided to facilitate entry of the pins into the recesses.

As illustrated by the attached drawings the change of orientation from the wider groove to the narrower groove is clockwise as seen therein, and with these specific embodiments corresponding anticlockwise change is not desirable, since the arm end 14 is now moved away from the common retaining tab 30, so that it cannot be as effective, and there are now no transverse supporting sidewalls for engagement with the main part of the wiper arm, which is preferred to give the maximum available transverse retention.

It will be seen that a clip of the invention is particularly suited for manufacture by moulding as an integral unit from plastics materials, such as the unfilled polyester sold by Canadian General Electric Co. under the trade mark "VALOX 325", such a material having the necessary strength while providing intrinsically the resilience required for proper function of both the described retaining means and attachment means. Thus, the present invention provides an extremely simple and effective combination wiper clip which, despite its relative complexity of function and operation, can readily be moulded as a single integral unit.

I claim:

1. A combination windshield wiper clip for the selective detachable attachment of a windshield wiper assembly to at least two wiper arms of the hooked end type having arm ends of different transverse widths, the clip comprising:
    a clip body including attachment means for releasable pivoting attachment of the clip within a slot in the superstructure of a wiper assembly,
    the clip body being shaped to fit within the hooked end of a first wiper arm of a wider width and to be closed embraced thereby with the arm in a respective first angular orientation in a longitudinal plane,
    the clip body having therein a groove for the reception therein of the hooked end of a second wiper arm of narrower width disposed in said longitudinal plane in a respective second angular orientation different from said first orientation for transverse retention of the narrower hooked wiper arm end in the groove,
    and retaining means for the releasable retention of either a wider or a narrower wiper arm hooked end closely embracing the clip body within the arm hooked end.

2. A wiper clip as claimed in claim 1, wherein said attachment means comprise a keyhole shaped slot in the clip body for releasable snap attachment on a transverse pivot pin in the wiper superstructure body.

3. A wiper clip as claimed in claim 1, wherein said releasable retaining means comprise an extension of the clip body having thereon a locking tab lockingly engagable in a slot in the hooked arm end, the tab being urged for such locking engagement by the resilience of the material of the wiper clip body.

4. A wiper clip as claimed in claim 3, wherein the releasable retaining means clip body extension includes a portion thereof embracable by the reverse hook end of a reverse hook end wiper arm.

5. A combination windshield wiper clip for the selective detachable attachment of a windshield wiper assembly to at least two wiper arms of the hooked end type having arm ends of different transverse widths, the clip comprising:
    a clip body including attachment means for releasable pivoting attachment of the clip to the superstructure of a wiper assembly,
    the clip body having separate first and second grooves therein for the reception of respective first and second hooked wiper arm ends of said different widths closely embracing the clip body,
    the said first and second grooves overlying one another in the clip body and having different angular orientations therein in the same longitudinal plane to provide respective groove side walls for transverse retention of each hooked wiper arm end in its respective groove,
    and retaining means for the releasable retention of either a wider or a narrowerwiper arm hooked end closely embracing the clip body within the arm hooked end.

6. A wiper clip as claimed in claim 5, wherein said attachment means comprise a keyhole shaped slot in the clip body for releasable snap attachment on a transverse pivot pin in the wiper superstructure body.

7. A wiper clip as claimed in claim 5, wherein said releasable retaining means comprise an extension of the clip body having thereon a locking tab lockingly engagable in a slot in the hooked arm end, the tab being urged for such locking engagement by the resilience of the material of the wiper clip body.

8. A wiper clip as claimed in claim 7, wherein the releasable retaining means clip body extension includes a portion thereof embracable by the reverse hook end of a reverse hook end wiper arm.

* * * * *